US009875093B2

United States Patent
Li

(10) Patent No.: US 9,875,093 B2
(45) Date of Patent: Jan. 23, 2018

(54) RACK SERVER DEVICE FIRMWARE UPDATE USING NETWORK SWITCH

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/853,154

(22) Filed: Sep. 14, 2015

(65) Prior Publication Data

US 2017/0075676 A1    Mar. 16, 2017

(51) Int. Cl.
G06F 9/445    (2006.01)
G06F 9/44    (2006.01)

(52) U.S. Cl.
CPC . G06F 8/65 (2013.01); G06F 8/71 (2013.01)

(58) Field of Classification Search
None
See application file for complete search history.

(56) References Cited

U.S. PATENT DOCUMENTS

| | | | | |
|---|---|---|---|---|
| 8,887,144 B1* | 11/2014 | Marr | ............................ | G06F 8/65 |
| | | | | 713/2 |
| 2007/0233538 A1* | 10/2007 | Zpevak | ...................... | G06F 8/71 |
| | | | | 705/7.14 |
| 2013/0138979 A1* | 5/2013 | Wang | ................... | H04L 12/6418 |
| | | | | 713/300 |
| 2015/0373542 A1* | 12/2015 | Schrecker | ............. | H04B 5/0006 |
| | | | | 455/411 |

FOREIGN PATENT DOCUMENTS

| | | |
|---|---|---|
| CN | 103186404 A | 7/2013 |
| TW | 200627140 A | 8/2006 |

OTHER PUBLICATIONS

Taiwanese Office Action for Application No. 104137572, dated Feb. 18, 2017, w/ First Office Action Summary.

* cited by examiner

*Primary Examiner* — Chuck Kendall
(74) *Attorney, Agent, or Firm* — Nixon Peabody LLP; Eduardo J. Quinones; Zhou Lu

(57) ABSTRACT

A system and method of updating device firmware on a rack server computer system using a network switch. The network switch receives a request to update the firmware of a device in the rack server computer system. The network switch determines the location of the device in the rack server system and transmits the firmware update to the device and commands the device to update its firmware using the firmware update transmitted by the switch. Alternatively, the network switch automatically detects a new device connected to the network switch in the rack server computer system. The network switch determines the identification of the new device, including its firmware, and determines if a newer version of the device firmware is available. The network switch obtains the newer version of the device firmware, transmits the firmware to the device, and commands the device to update its firmware with the newer version.

20 Claims, 5 Drawing Sheets

RACK SERVER DEVICE FIRMWARE UPDATE USING NETWORK SWITCH

TECHNICAL FIELD

Embodiments of the invention are generally related to rack server computer systems. More specifically, embodiments of the invention are generally related to rack server computer systems and updating the firmware of a device in a rack server computer system using a network switch.

BACKGROUND

A typical data center can include network switches, system servers, and storage servers. Each of these servers can include a processor and/or embedded controller firmware, such as a server basic input/output system (BIOS), baseboard management controller (BMC), and power supply unit (PSU). Generally, the firmware for these servers is occasionally updated to address operational issues and add/change server functions, for example. However, traditional rack server computer system firmware update methods are inefficient and labor-intensive. One method is to manually update the firmware of each device in the rack server computer system individually. Another method is to remotely update the firmware of each device in the rack server computer system, but a technician and/or software is needed to input each device's internet protocol (IP) address or, alternatively, configure the IP address range and then discover each device's unique IP address in order to update the firmware of each device in the rack server computer system.

SUMMARY

Some embodiments within this disclosure provide a system and method of updating the firmware of a device in a rack server computer system using a network switch. The rack server computer system in a data center includes system servers, storage servers, network switches, power supply units (PSUs), and fans, among other devices. System servers and/or storage servers are connected to the network switch. The network switch connected to the system servers, storage servers, or other devices can determine the IP and media access control (MAC) address of each device and establish communication with each device. Once the network switch has determined each device's IP and MAC address and established communication, the network switch can transmit a firmware update to each device and a command to each device to update its firmware.

In an embodiment of the disclosure, the network switch receives a requirement to update a device firmware via an input device, such as a graphical user interface (GUI), a serial console, or a network console. The network switch determines if such a device is connected to the network switch by reviewing the list of devices and their internet protocol (IP) addresses connected to the network switch. The network switch can receive an update of the firmware for the device from a network, a server, or via flash memory and can transmit, using the determined IP address, the update of the firmware from the network switch to the device connected to the network switch that utilizes the firmware. The network switch can also send a command to the device to update its firmware.

In an embodiment of the disclosure, the network switch can determine if the device connected to the network switch utilizes the version of the firmware to be updated.

In an embodiment of the disclosure, the network switch can determine that the device connected to the network switch utilizes the version of firmware to be updated. The network switch can check a firmware database and/or a server to determine if an updated version of the firmware exists.

In an embodiment of the disclosure, the network switch can receive a requirement to update the firmware submitted to the network switch via a network connection, a serial console, or a flash memory, for example.

In an embodiment of the disclosure, the network switch can receive the update of the firmware and can check the update of the firmware for a security key.

In an embodiment of the disclosure, the network switch can receive the update of the firmware and can verify the integrity of the firmware using a checksum algorithm, for example.

In an embodiment of the disclosure, the network switch can receive the update of the firmware and can verify the update of the firmware against the identifying information of the device.

In an embodiment of the disclosure, the network switch can include detecting if the device is connected to the network switch. Once the network switch has determined that the device is connected, the network switch can determine if the device utilizes the firmware. If the device utilizes the firmware, the IP address of the device can be obtained by the network switch. The network switch can request additional identifying information and firmware information from the device connected to the network switch to determine the version of the firmware to be updated. The network switch can receive the update of the firmware for the device connected to the network switch, can transmit the firmware update, and can send a command to update the firmware to the device using the determined device IP address of the device.

In an embodiment of the disclosure, a method is provided for updating a device firmware using a network switch. The method includes receiving a requirement to update the firmware of the device. The method can include determining if the device is connected to the network switch. The method can include obtaining an IP address of the device connected to the network switch that uses the firmware. The method can include receiving an update of the firmware from a network, a server, or flash memory. The method can include transmitting, using the determined IP address, the update of the firmware of the device from the network switch to the device that utilizes the firmware and sending a command to the device to update its firmware.

In an embodiment of the disclosure, the method can include determining if the device connected to the network switch utilizes the version of the firmware to be updated.

In an embodiment of the disclosure, the method can include checking a firmware database or a server to determine if an updated version of the firmware of the device exists.

In an embodiment of the disclosure, the method can include receiving the update of the firmware of the device via a network, a serial console, or flash memory, for example.

In an embodiment of the disclosure, the method can include checking the update of the firmware of the device for a security key.

In an embodiment of the disclosure, the method can include verifying the integrity of the update of the firmware of the device using a checksum algorithm, for example.

In an embodiment of the disclosure, the method can include verifying the update of the firmware of the device against the identifying information of the device to insure that the firmware update is appropriate for the device.

In an embodiment of the disclosure, the method can include detecting a new device connected to the network switch. The method can include determining if the new device connected to the network switch utilizes firmware to be updated. The method can include obtaining, in response to the determining, an internet protocol address for the new device that utilizes the firmware. The method can include requesting from the new device identifying information and firmware version information. The method can include receiving the update of the firmware of the new device from a network, a server, or flash memory. The method can include transmitting, using the determined internet protocol address, the update of the firmware from the network switch to the new device that utilizes the firmware and sending a command to the new device to update its firmware.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Embodiments of this disclosure provide a system and method of updating the firmware of a device in a rack server computer system using a network switch. A network switch is a computer networking device that physically connects devices together on a network, by using packet switching to receive, process, and forward data to the destination device, such as a system or storage server. Packet switching groups data into blocks, called packets that are transmitted to be shared by multiple communication sessions. A network switch can be used in a rack server computer system in a data center. A typical rack server computer system in a data center includes system servers, storage servers, network switches, power supplies, and fans, for example. System servers and storage servers are generally connected to a network switch in a rack server computer system. The system servers and storage servers are typically connected to the network switch with cables via ports in the network switch. When the system servers and storage servers are connected to the network switch, the network switch can determine the device media access control (MAC) and IP address of each server and device and can communicate with each device. The network switch can provide, obtain, and command the update of the firmware to each connected device, without requiring the manual firmware updates of each device firmware or the remote update of each device firmware.

Figure 1:
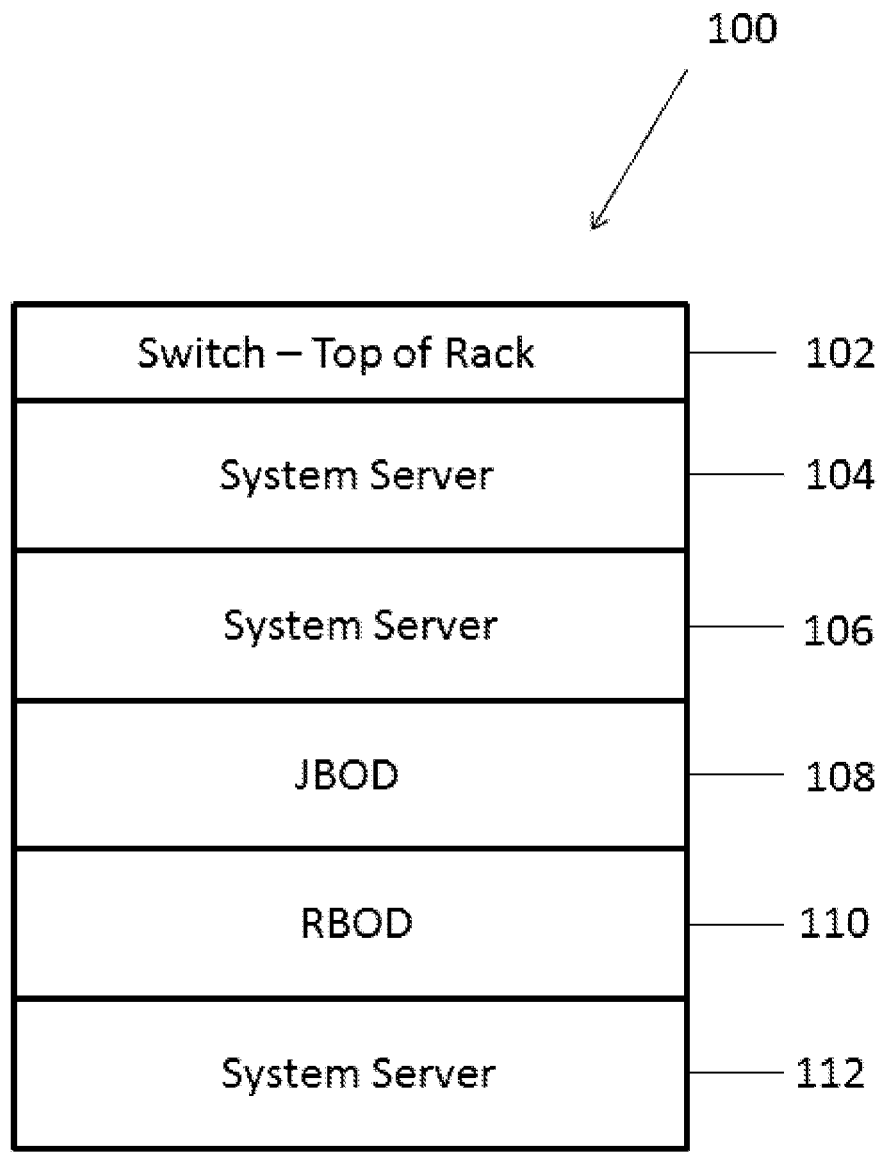
FIG. 1 is an exemplary diagram of an embodiment of the disclosure, in which a rack server computer system is shown including a network switch located at the top of the rack, for example, and additional components are shown located below the network switch in the rack.

FIG. 1 is an exemplary diagram of a rack server computer system 100 including a network switch 102 located at the top of the rack server computer system 100. In this embodiment, the system servers 104, 106 are located beneath the network switch 102. A Just-a-Bunch-Of-Disks (JBOD) 108 is located beneath the system servers 104, 106. A Redundant-Bunch-Of-Disks (RBOD) is located beneath the JBOD 108, and a system server 112 is located at the bottom of the rack server computer system 100. It should be noted that the arrangement is exemplary and not limiting, and other arrangements are within the scope of the disclosure.

The network switch 102 is connected to each of the devices 104, 106, 108, 110, and 112 beneath it in the rack server computer system 100. Typically, the network switch 102 is connected to each of the devices 104, 106, 108, 110, and 112 with cables, though in other embodiments, wireless connections or other connections may be used. The system servers 104, 106, and 112 can include computer hardware and software that responds to requests across a computer network to provide a network service. Examples of system servers 104 are database servers, file servers, mail servers, print servers, web/Internet servers, gaming servers, or application servers. Some system servers 104 include a high-performance processor and memory, and storage capacity.

The JBOD 108 of the rack server computer system 100 is an arrangement of computer hard drives that typically does not include redundancy or performance improvements. Since the JBOD 108 is not redundant, it does not include fault tolerance if a particular hard drive fails. The hard drives in the JBOD 108 can be configured in a variety of ways, including, for example, a single pool of available storage. The system servers 104, 106, and 112 can access the computer hard drives of the JBOD 108 to retrieve, store, or modify information, for example.

The RBOD 110 located beneath the JBOD 108 in the rack server computer system 100 can be referred to as a RAID (Redundant Array of Inexpensive Disks). The RBOD 110 is an arrangement of multiple computer hard drives that are typically combined in a single unit, but unlike the JBOD 108, the arrangement is for data redundancy and/or performance improvement, such as data striping, which includes dividing data into blocks and spreading the blocks across multiple computer hard drives. The RBOD 110 can be configured for a variety of performance goals, such as reliability, availability, performance, and capacity, for example.

Typically, the network switch 102 can be connected individually to each of the devices 102, 104, 106, 108, 110, and 112. When the network switch 102 is connected to the devices 102, 104, 106, 108, 110, and 112, the network switch can establish communication and can determine or can assign MAC and IP address to each of the devices 102, 104, 106, 108, 110, and 112. Once communication has been established, the network switch 102 can access various information about each of the devices 102, 104, 106, 108, 110, and 112. For example, the network switch 102 can determine the firmware version of each of the devices 102, 104, 106, 108, 110, and 112. The network switch can also determine the identification of each device 102, 104, 106, 108, 110, and 112, such as manufacturer, make, and model.

In one embodiment, the network switch 102 receives a requirement to update the firmware of a device in the rack server computer system 100. The requirement could originate from a variety of sources, such as a manufacturer or computer technician. The network switch 102 can determine if the device in the requirement is connected to the network switch 102. For the purposes of illustration only, a requirement to update the firmware of the system server 104 can be originated by the manufacturer. The network switch 102 can determine, for example, that system server 104 is connected to the network switch 102 and can obtain the IP address for the system server 104. The network switch can receive the firmware update from a variety of sources, such as but not limited to, a network or a server. The network switch 102 can transmit the firmware update to the system server 104 using the IP address of the server 104 that the network switch had previously determined. The switch can send a command to the system server 104, or other device connected to the network switch 102, to update its firmware accordingly.

Figure 2:
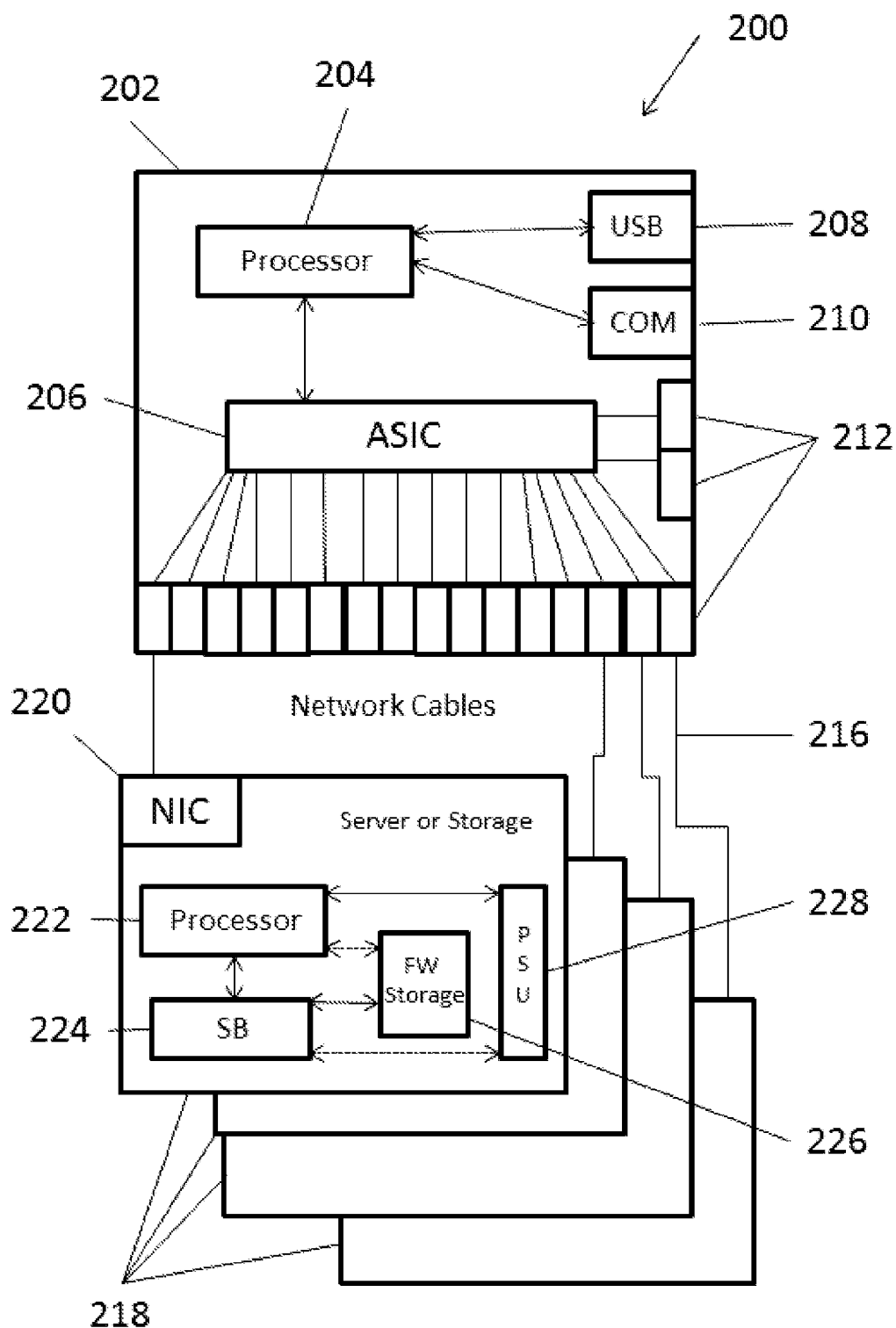
FIG. 2 is an exemplary diagram of an embodiment of the disclosure, in which a network switch and its subcomponents are shown connected to several server and/or storage devices.

FIG. 2 is an exemplary view of a rack server computer system 200, including a network switch 202. The network switch 202 includes a variety of components, including the processor 204, application-specific integrated circuit (ASIC) 206, a universal serial bus (USB) 208, and communication (com) port 210. The processor 204 can be connected to USB 208 and com port 210. The processor 204 can access data through either the USB 208 or the com port 210, such as to retrieve firmware updates, for example. The processor 204 can be a central processing unit (CPU) or a service or management controller capable of executing software. The processor 204 can be connected to the ASIC 206. The ASIC 206 can be connected to a number of ports 212 of the network switch 202. The ASIC 206 can forward network packets to or from the corresponding ports 212 of the network switch 202. The ports 212 can also be used to connect to a host device and to connect to peripheral devices, such as the system servers and/or storage servers 218, though in other embodiments, other devices may also be attached to the ports 212, such as JBODs or RBODs.

A plurality of network cables 216 can connect the network switch 202 to the system servers and/or storage servers 218 via the ports 212 of the network switch 202. Each server/storage server 218 can include a network interface controller (NIC) 220. The NIC 220 typically connects a computer to a computer network. In the present example, system server 218 includes a NIC 220 connected to a computer network via the network cables 216 and the network switch 202. The NIC 220 can be a stand-alone card, can be embedded in a processor, or built-in to a device motherboard, for example. Each server/storage server 218 can also include a processor, which can be a CPU, BMC, Serial Attached Small Computer System Interface (SAS/SCSI), or storage expander controller to receive the new firmware update image file from the NIC 220 and to update the system/storage server 218 firmware. The system/storage server 218 may also include a southbridge chip 224. A southbridge chip 224 is one of the two chips in the core logic chipset found on some computer motherboards. The southbridge 224 typically processes all of a computer's input/output functions. Both the processor 222 and the southbridge 224 can be connected to the firmware storage device 226, also located in system/storage server 218.

The firmware storage device 226 typically stores the firmware of the system/storage server 218. The firmware storage device 226 can be a variety of storage devices, such as flash memory or electrically erasable programmable read-only memory (EEPROM). EEPROM is a type of non-volatile memory that can store small amounts of data that is preserved when the power is removed. Flash memory was developed from EEPROM and can store larger amounts of data. In either case, the firmware storage device 226 can be updated by the network switch 202. The firmware image file stored within firmware storage device 226 can be for a variety of devices. For example and without limitation, the firmware image file can be for the system/storage server 218 BIOS, server 218 BMC, power supply unit (PSU) 228, SAS expander, storage controller, or NIC 220.

The system/storage server 218 and its components 220, 222, 224, and 226 as well as other components within the system 200 can receive power from the PSU 228. The PSU 228 can be located within system/storage server 218 or externally to the system/storage server 218. The PSU 228 can also include firmware that can be updated by the network switch 202.

Figure 3:
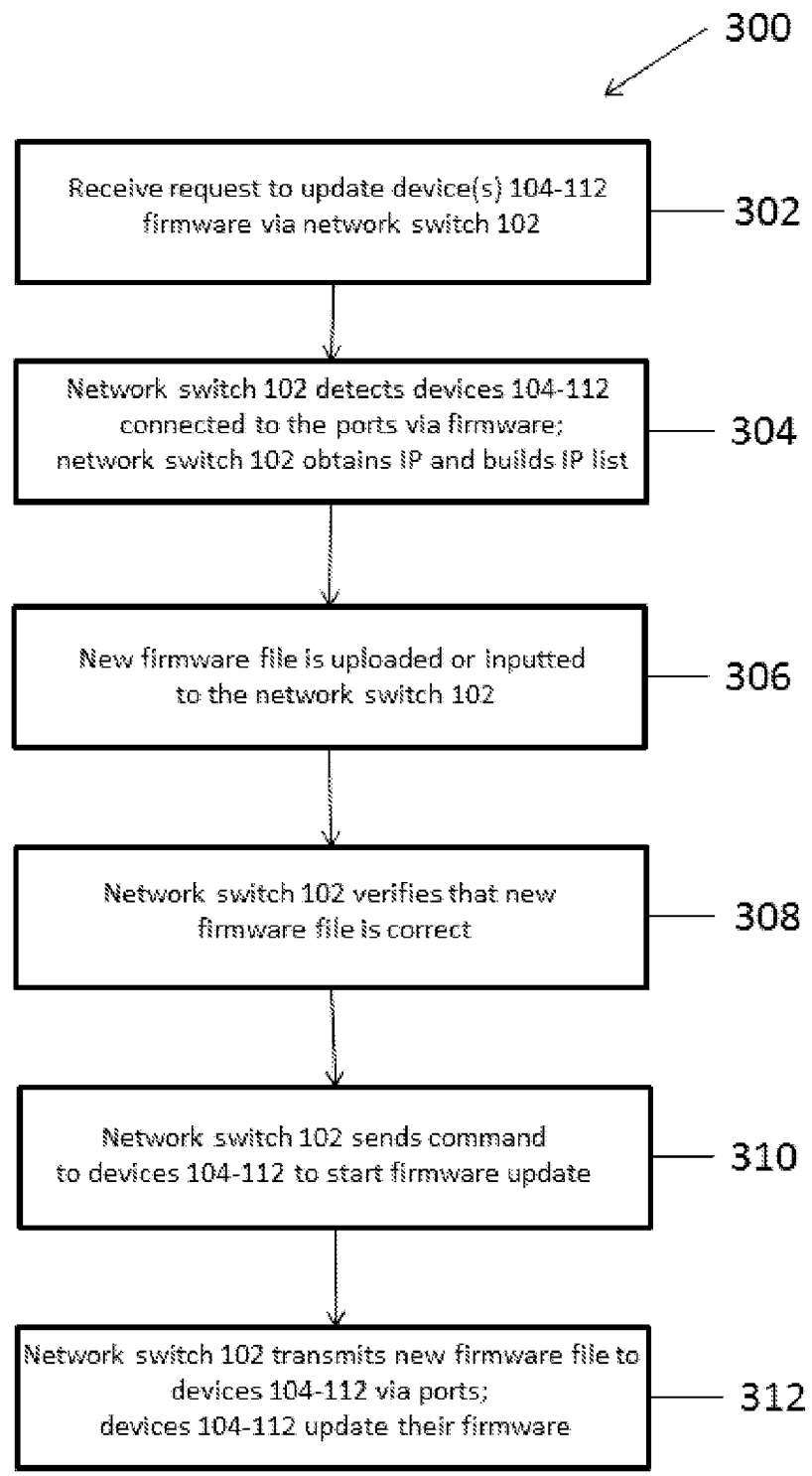
FIG. 3 is an exemplary process of an embodiment of the disclosure, in which a network switch processes a request to update a device using the switch.

FIG. 3 is an exemplary flow chart 300 of a firmware update using a network switch for a rack server computer system. In step 302, the network switch can receive a request to update at least one device firmware with the rack server computer system. The request can be submitted via a computer technician, a computer network, or a manufacturer, for example. A computer technician may use a web-based user interface to update device firmware using the network switch. Alternatively, a serial or system console can be used, which typically is the text entry and display for system administrative messages, such as the BIOS or boot loader. The request can also be submitted using flash memory/USB or a com port of the network switch.

In step 304, the network switch can detect or discover device(s) connected to the ports of the network switch that utilize the firmware, and many ignore devices connected to the downstream ports that do not utilize the firmware. Once the network switch has discovered the connected devices that utilize the firmware in the update request, the network switch can obtain the IP addresses of the device(s) and can build a list of the IP addresses corresponding to the connected device(s). The network switch can communicate with the device(s), accessing their firmware storage device to determine the version of the firmware currently installed, as well as other device information, such as manufacturer, make and model. Alternatively, the device(s) can provide the version of firmware installed and other device information when requested by the network switch.

In step 306, the updated firmware image file(s) can be obtained via a network or uploaded to the switch using a port such as a USB or a com port. For example, the network switch can include network access and can obtain updated firmware from a variety of sources, such as the device manufacturer. Alternatively, the network switch can obtain updated firmware from a port, such as the USB port or the com port, for example. A computer technician can insert a flash drive into the USB port storing updated firmware. The network switch can access the USB flash drive and retrieve the update of the firmware.

In step 308, the network switch can verify that the new firmware update file is correct by checking against the device identification and firmware version information. The network switch can also verify that the firmware is complete by running a test on the firmware such as a checksum test. A checksum algorithm test is typically run after a file has been transmitted from a download server to verify the integrity of the file; in the present example, a firmware update file. If the firmware update file is incorrect, based on the checksum or other test, the network switch may display or provide an error message, and/or attempt to retrieve the firmware update file again or from other source, for example. If the firmware update file is correct, based on the checksum algorithm or other test, the process moves to step 310. The network switch can determine that the new firmware is intended for the determined device(s).

In step 310, the network switch can send a command to the device(s) to start the firmware update process. The processor and/or southbridge of a server or storage device can access the firmware storage and can prepare to receive the new firmware update from the network switch.

In step 312, the network switch can transmit via its ports the firmware update to the determined device(s). The determined device(s) receiving the firmware update can proceed to update its firmware with the update received and commanded via the network switch and stored in the firmware storage of the determined device(s). The network switch can verify that the determined device(s) have successfully updated their firmware by re-determining the firmware version of the determined device(s) after sending the firmware update. If the network switch detects that one or more devices have not successfully updated their firmware, the network switch can display a message or signal, or make additional attempts to update the firmware, for example.

Figure 4:
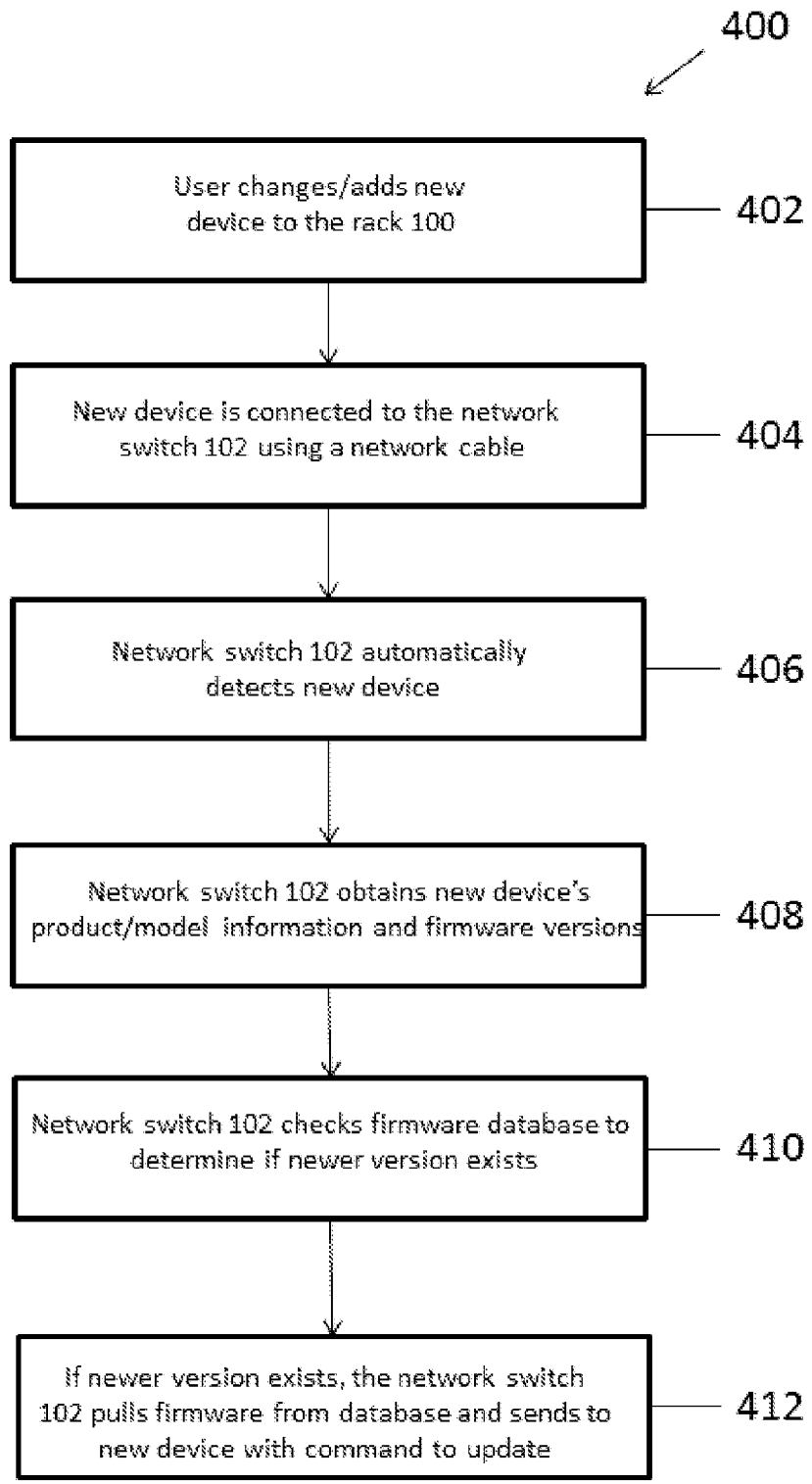
FIG. 4 is an exemplary process of an embodiment of the disclosure, in which a network switch automatically detects a device connected to the switch and automatically retrieves and sends the updated firmware to the newly connected device.

FIG. 4 is an exemplary flow chart 400 of a firmware update for a newly connected device using a network switch for a rack server computer system. In step 402, a technician or user changes or adds a new device to the rack of the rack server computer system. In step 404, the technician or user connects the new device to the network switch of the rack server computer system using a network cable, for example. In step 406, the network switch can detect the new device added to the rack of server computer system when the new device is connected to the ports of the network switch via the network cable. After the network switch detects the new device the network switch can obtain the IP addresses of the new device, and build a list of the IP and MAC addresses corresponding to the newly connected device. In step 408, the network switch can send a command to the new device to obtain information related to the firmware of the new device, such as the manufacturer, make, and model information of the device. The new device can respond by providing the requested information to the network switch. In step 410, the network switch can access at least one firmware database to determine if there is a new version of firmware for the new device. The network switch can use the information obtained from the new device after being automatically detected by the network switch when connected to a port. The network switch can obtain a new firmware update for the device. In step 412, if a newer version of the new device firmware exists, the network switch obtains the newer version of the firmware from a database or server, for example. The network switch can verify that the newer version of the firmware file is correct and complete by running tests on the newer version of the firmware such as a checksum test. If the newer version of the firmware is incorrect, based on the checksum or other test, the network switch may display or provide an error message, and/or attempt to retrieve the newer version of the firmware again or from other source. If the newer version of the firmware is correct, based on the checksum or other test, the network switch transmits the newer version of the firmware to the new device and sends a command to the new device to update its firmware with the newer version.

Figure 5:
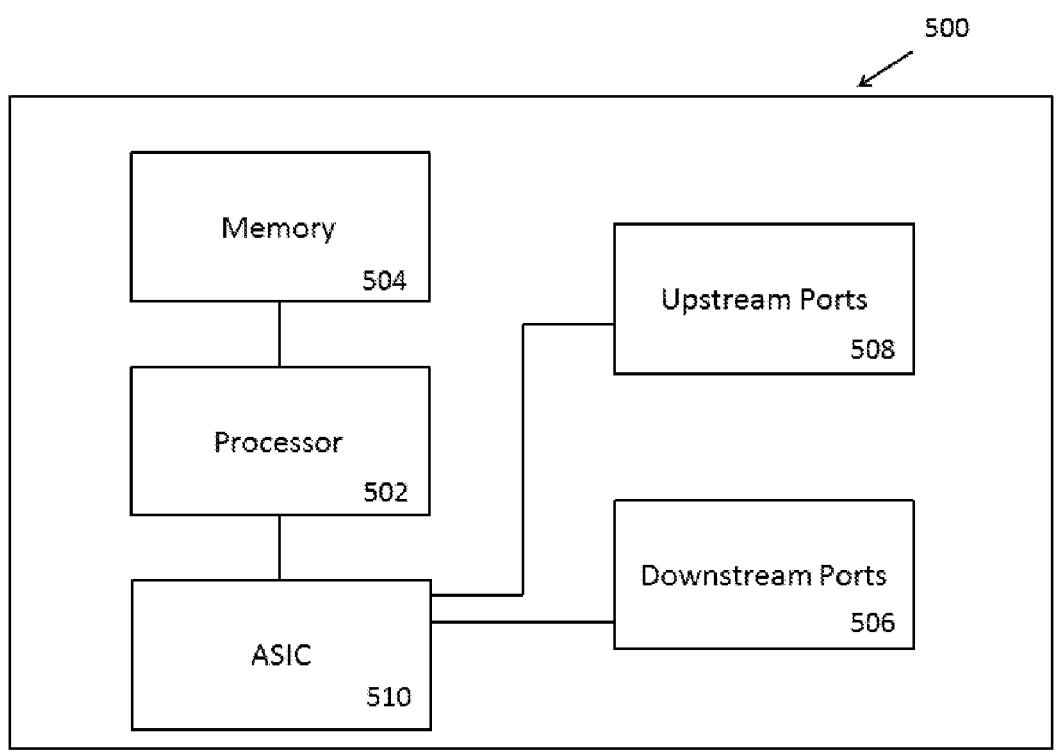
FIG. 5 is an exemplary diagram of an embodiment of the disclosure detailing components included in a network switch.

In FIG. 5, illustrates a logical arrangement of a set of general components of a network switch 500. In this example, the network switch 500 includes a processor 502 for executing instructions that can be stored in a memory device or element 504. As would be apparent to one of ordinary skill in the art, the network switch 500 can include many types of memory, data storage, or non-transitory computer-readable storage media, such as a first data storage for program instructions for execution by the processor 502, a separate storage for images or data, a removable memory for sharing information with other devices, etc. The network switch 500 typically will include downstream ports 506. As discussed, the network switch 500 in many embodiments will include at least one upstream port 508 able to receive input. This conventional input can include, for example, a USB flash drive, serial connection, com port, or other data connection, or any other such device or element whereby a user can input a command or data to the network switch 500. In some embodiments, the network switch 500 of FIG. 5 can include at least one ASIC 510 to forward network packets to or from the corresponding upstream or downstream ports 506, 508 of the network switch 500.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices that can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network switch for a plurality of nodes in a network, the network device being a computer networking device that physically connects devices in the network by using packet switching to receive, process and forward data to a destination device, comprising:
   a processor;
   a non-transitory computer-readable medium storing instructions which, if executed, cause the network switch to perform operations comprising:
      receiving, at the network switch, a requirement to update a firmware utilized by a device of the plurality of nodes;
      determining, by the network switch, that the device connected to the network switch utilizes the firmware;
      determining, by the network switch, an internet protocol address of the device;
      receiving, at the network switch, an update of the firmware; and
      transmitting, using the internet protocol address, the update of the firmware via at least one port of the network switch to the device.

2. The network switch of claim 1, wherein the operations of determining, by the network switch, that the device connected to the network switch utilized the firmware comprises requesting from the device identifying information and firmware information.

3. The network switch of claim 1, wherein the operations of determining, by the network switch, an internet protocol address of the device comprises checking a firmware database or a server to determine if a newer version of the firmware exists.

4. The network switch of claim 1, wherein the operations of receiving, at the network switch, the update of the firmware comprises checking for a security key.

5. The network switch of claim 1, wherein the update of the firmware comprises a checksum algorithm test.

6. The network switch of claim 1, wherein the operations of receiving, at the network switch, the update of the firmware comprises checking against the identifying information of the at least one device.

7. The network switch of claim 1, wherein the operations of transmitting comprises including a command to update the firmware.

8. The network switch of claim 1, the operations further comprising:
   detecting the device connected to the network switch;
   determining identifying information from the device; and
   determining a version of the firmware of the device.

9. A method of updating a device using a network switch, the network device being a computer networking device that physically connects devices in a network by using packet switching to receive, process and forward data to a destination device, comprising:
   receiving, at the network switch, a requirement for an update of a firmware for a device;
   determining, by the network switch, that the device connected to the network switch utilizes the firmware;
   determining, by the network switch, an internet protocol address of the device;
   receiving, at the network switch, an update of the firmware;
   starting a process to update the firmware of the device; and
   transmitting, using the internet protocol address, the update of the firmware via at least one port of the network switch to the device.

10. The method of claim 9, wherein determining, by the network switch, that the device connected to the network switch utilizes the firmware includes:
    determining identifying information and firmware information of the device.

11. The method of claim 10, wherein determining, by the network switch, the internet protocol address of the device includes:
    accessing a firmware database or a server to determine if a newer version of the firmware exists.

12. The method of claim 9, further comprising:
    checking the update of the firmware for a security key.

13. The method of claim 9, further comprising:
    verifying the update of the firmware using a checksum algorithm.

14. The method of claim 9, wherein transmitting, using the internet protocol address, the update of the firmware via at least one port of the network switch to the device includes:
    sending a command to update the firmware.

15. A non-transitory computer-readable storage medium including instructions that, when executed by at least one processor of a system, cause the system to perform operations comprising:
    receiving, at a network switch of the system, a requirement for an update of a firmware for a device, wherein the network device is a computer networking device that physically connects devices in a network by using packet switching to receive, process and forward data to a destination device;
    determining, by the network switch, that the device connected to the network switch utilizes the firmware;
    determining, by the network switch, an internet protocol address of the device;
    receiving, at the network switch, an update of the firmware;
    starting a process to update the firmware of the device; and
    transmitting, using the internet protocol address, the update of the firmware via at least one port of the network switch to the device.

16. The non-transitory computer-readable storage medium of claim 15, wherein determining, by the network switch, an internet protocol address of the device includes:
    accessing a firmware database or a server to determine if a newer version of the firmware exists.

17. The non-transitory computer-readable storage medium of claim 15 including instructions that, when executed by at least one processor of a system, cause the system to further perform operations comprising: checking the update of the firmware for the at least one device for a security key.

18. The non-transitory computer-readable medium of claim 15 including instructions that, when executed by at least one processor of a system, cause the system to further perform operations comprising: checking the update of the firmware against identifying information of the at least one device.

19. The non-transitory computer-readable storage medium of claim 15 including instructions that, when executed by at least one processor of a system, cause the system to further perform operations comprising: checking the update of the firmware for the at least one device using a checksum algorithm.

20. The non-transitory computer-readable storage medium of claim 15 including instructions that, when executed by at least one processor of a system, cause the system to further perform operations comprising: transmitting a command to the device that utilizes the firmware to update the firmware of the device.

* * * * *